United States Patent [19]

Fukuda

[11] Patent Number: 4,639,237

[45] Date of Patent: Jan. 27, 1987

[54] SHAFT COUPLING WITH PRESS FIT COIL SPRINGS FORMING RESILIENT TORQUE-TRANSMITTING ELEMENTS

[75] Inventor: Kazuichi Fukuda, Fujisawa, Japan

[73] Assignee: Shoyo Engineering Company Limited, Tokyo, Japan

[21] Appl. No.: 766,683

[22] Filed: Aug. 19, 1985

Related U.S. Application Data

[63] Continuation-in-part of Ser. No. 526,127, Aug. 24, 1983, abandoned.

[30] Foreign Application Priority Data

| Aug. 26, 1982 | [JP] | Japan | 57-146791 |
| May 19, 1983 | [JP] | Japan | 58-17420 |
| May 19, 1983 | [JP] | Japan | 58-86648 |

[51] Int. Cl.⁴ ............................................. F16D 3/56
[52] U.S. Cl. .................................... 464/65; 464/81
[58] Field of Search .................. 464/51, 61, 62, 65, 464/66, 81, 85, 106

[56] References Cited

U.S. PATENT DOCUMENTS

| 1,345,394 | 7/1920 | O'Connor | 464/65 |
| 1,491,761 | 4/1924 | Smith | 464/65 |
| 1,586,250 | 5/1926 | Lane | 464/65 |
| 1,642,907 | 9/1927 | Sundh | 464/65 |
| 2,453,383 | 11/1948 | Rathman | 464/65 |
| 2,701,456 | 2/1955 | Brownstein | 464/65 X |
| 2,869,339 | 1/1959 | Drake | 464/85 |
| 2,959,944 | 11/1960 | Brownstein | 464/65 |

FOREIGN PATENT DOCUMENTS

| 409067 | 4/1935 | Belgium . |  |
| 1110957 | 8/1961 | Fed. Rep. of Germany . |  |
| 689146 | 1/1930 | France | 464/65 |
| 39659 | 1/1931 | France . |  |
| 12-6942 | 5/1937 | Japan . |  |
| 416177 | 9/1934 | United Kingdom | 464/65 |
| 566118 | 5/1943 | United Kingdom . |  |

Primary Examiner—Stuart S. Levy
Assistant Examiner—Daniel P. Stodola
Attorney, Agent, or Firm—Wenderoth, Lind & Ponack

[57] ABSTRACT

A shaft coupling is composed of first and second hubs, each of which has a flange provided with a plurality of spring holes over its circumference at one end of a cylindrical portion of the hub, to which transmission shafts are connected, and a plurality of coil springs are fitted in the spring holes in the flange. The first and second hubs are placed so that their flanges face each other with axial clearance left betweem them. The coil springs are set over the two flanges and tightly fitted in the individual spring holes in a compressed state.

15 Claims, 26 Drawing Figures

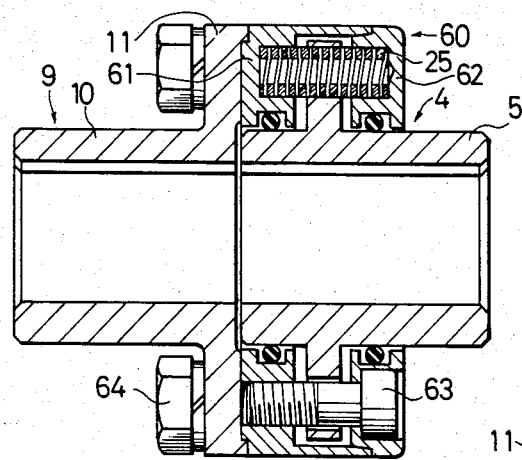
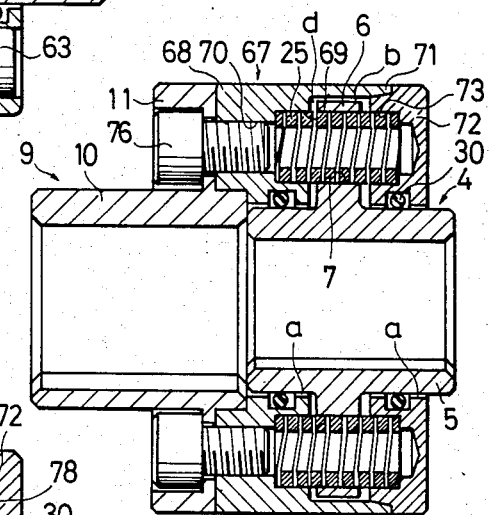
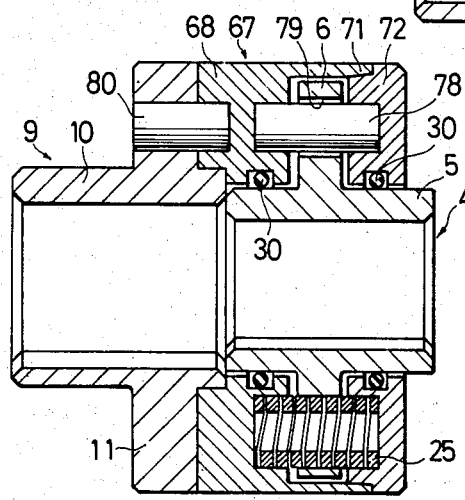

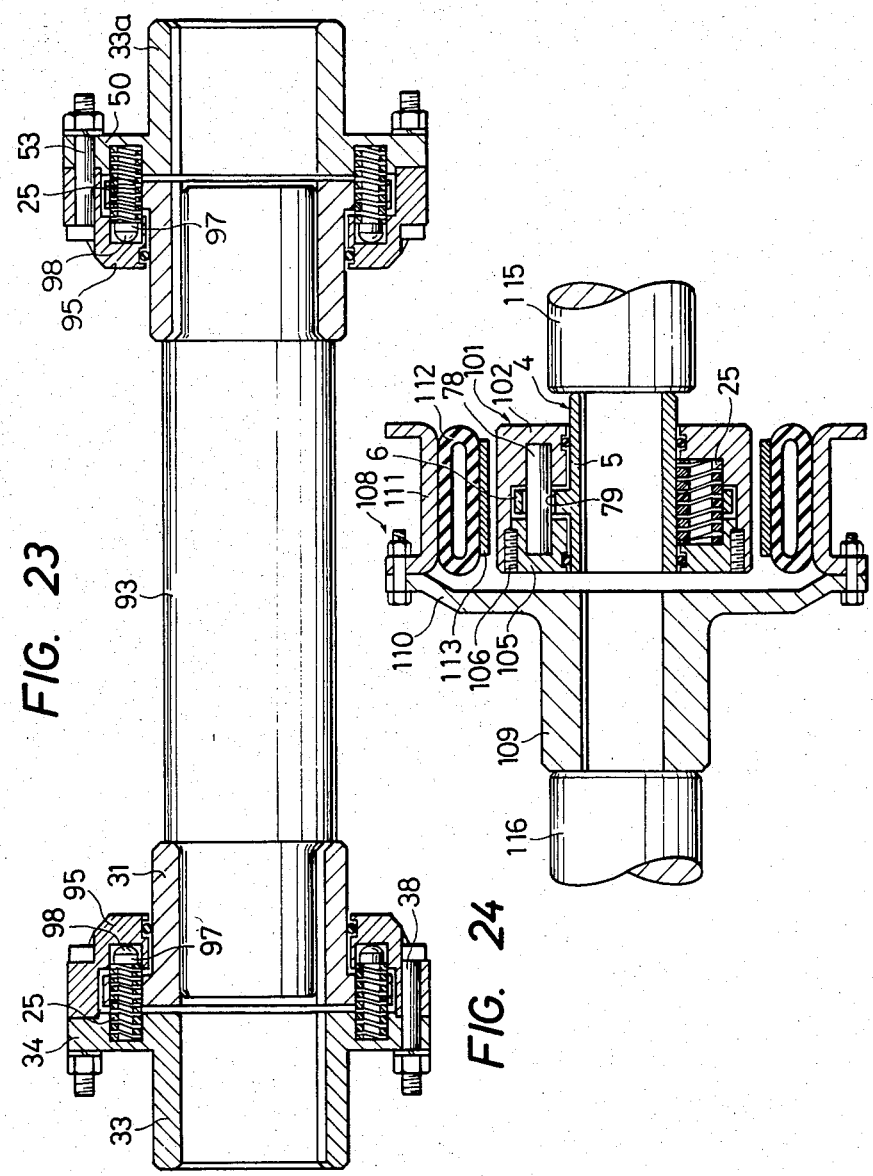

SHAFT COUPLING WITH PRESS FIT COIL SPRINGS FORMING RESILIENT TORQUE-TRANSMITTING ELEMENTS

This application is a continuation-in-part of now abandoned application Ser. No. 526,127, filed Aug. 24, 1983.

BACKGROUND OF THE INVENTION

This invention relates to shaft couplings that achieve flexibility and shock absorbing functions by use of coil springs as their resilient torque-transmitting elements.

Various types of shaft couplings that transmit torque by means of coil springs are marketed because of their relatively large shaft-misalignment accommodating and shock-absorbing capacities.

FIG. 1 shows an example of such conventional coil-spring shaft couplings. This shaft coupling is composed of two mating hubs 1 each of which, in turn, has a plurality of holes 2 in which coil springs are fitted. A coil spring 3 is interposed between the two hubs 1 with one end thereof fitted in one of the corresponding spring holes 2 and the other end in the other. Torque is transmitted from one of the hubs 1 to the other via the coil spring 3. Accommodation of misalignment and shock absorption are achieved by the lateral deformation of the coil spring with respect to the axis thereof.

Although simple in construction, the shaft coupling in FIG. 1 has the following problems: With the coil spring 3 loosely fitted in the spring holes 2, there is a backlash between the coil springs and the spring holes 2 that lowers the accuracy of the rotational angle. Besides, the spring holes 2 are enlarged during use by impact and abrasion caused by the coil spring 3, with the results that the accuracy of the rotational angle becomes still lower and that the coil spring 3 fractures by fatigue failure after a relatively short period of use.

Since the coil spring is not rigidly but only loosely or movably fitted in the spring holes, the shaft coupling of the type just described is unsuitable for the transmission of large torques.

This invention concerns the improvement of the shaft coupling shown in FIG. 1 and that has the advantage of simple construction.

SUMMARY OF THE INVENTION

An object of this invention is to provide a flexible shock-absorbing shaft coupling that is relatively simple in construction, with a coil spring interposed between hubs without backlash.

Another object of this invention is to provide a coil-spring shaft coupling that transmits large torques.

A shaft coupling according to this invention is composed of first and second hubs to which transmission shafts are connected, each of the hubs having a cylindrical portion that carries a flange with spring holes provided on the periphery thereof, and coil springs that are fitted in the spring holes. The first and second hubs are disposed so that the flanges face each other, with clearance left therebetween. The coil springs are interposed between the two hubs, tightly fitted in the spring holes in a compressed state.

This type of shaft coupling takes advantage of a characteristic of the coil spring that its outside diameter becomes larger when compressed, in proportion to the amount of deflection, than at no load. The coil spring is designed to a size that loosely fits in the spring holes in the driving- and driven-side hubs at no load. When alignment is completed, the coil spring is compressed so that the periphery thereof is resiliently pressed against the internal surface of the spring holes, i.e. to provide a press fit therebetween. When the driving shaft rotates, the coil spring elastically deforms in the direction perpendicular to the axis of the spring by an amount proportional to the torque to be transmitted, thereby achieving torque transmission and shock absorption. No play is left between the hubs and resilient spring. Even when the inside of the spring hole has been expanded by abrasion, the coil spring resiliently increases its outside diameter to create no play therebetween, thereby achieving shock absorption and misalignment accommodation satisfactorily.

A feature of this invention is that play or backlash is eliminated at all times with the use of coil springs. Torque can be transmitted directly from the driving-side hub to the driven-side hub by means of the coil springs alone, without allowing the torque to act directly upon reamer bolts and/or other connecting members. The result is a perfectly play-free shaft coupling.

A bellows-type coupling is an example of a play-free shaft coupling available on the market, and includes a driving-side hub, bellows and a driven-side hub that are all welded together. But they are very small in size. Couplings of this type in ordinary size are difficult to assemble and, therefore, practically unavailable.

In addition to the feature described previously, the shaft coupling of this invention offers some other advantages. Since a free, wide choice is allowed for the manner of fitting and specifications of coil springs depending upon their fitting conditions, the shaft coupling of this invention is much more compact and can be manufactured at lower cost than gear couplings and flanged flexible couplings that are typical of the commercially available shaft couplings of similar capacities.

For maintenance in use, the shaft coupling according to this invention essentially requires no lubrication to ensure smooth operation because there is no play between the hubs and transmission elements and the transmission elements perform their function through elastic deformation. But lubrication, if applied, of course, lengthens the service life of the coupling in which many metal parts are kept in contact with each other.

Both ends of the coil spring of the conventional shaft coupling previously described are loosely fitted in the spring holes, and therefore the coil spring is supported in a condition of where the ends are free. By contrast, the coil spring of the shaft coupling of this invention is tightly fitting in the spring holes with both ends fixed. Furthermore, the load is applied to the coil spring at the middle portion thereof. Accordingly, the coil spring of the shaft coupling of this invention is able to transmit twice, or even greater, the torque than that of the conventional shaft springs.

BRIEF DESCRIPTION OF THE DRAWINGS

FIGS. 12 through 17 are sections showing other embodiments of this invention.

FIG. 23 is a cross-sectional view showing two shaft couplings connected together with an intermediate shaft disposed therebetween.

FIGS. 24 and 25 are cross-sectional views showing shaft couplings equipped with a air clutch, FIGS. 24 and 25 respectively showing states in which the air clutch is disconnected and connected.

DETAILED DESCRIPTION OF THE PREFERRED EMBODIMENTS

Preferred Embodiment 1

Figure 1:
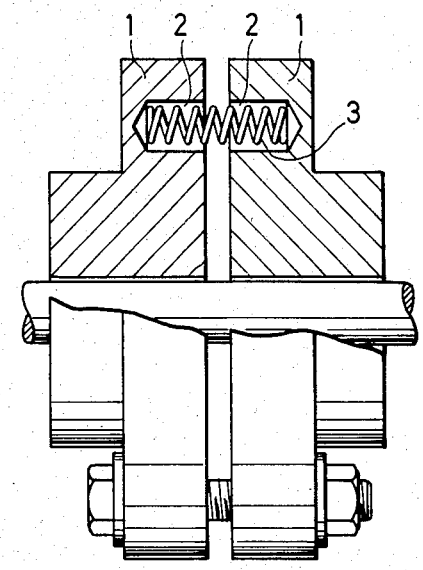
FIG. 1 is a view, partially in cross-section, of an example of conventional coil-spring shaft couplings.
Figure 2:
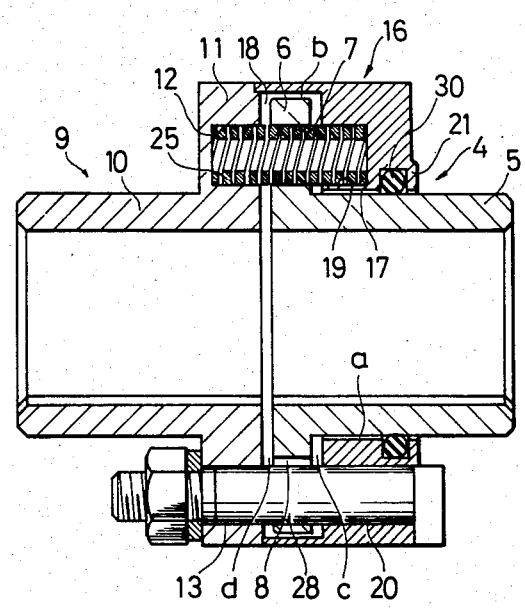
FIG. 2 is a cross-sectional side view of a first embodiment of the shaft coupling according to this invention.
Figure 3:
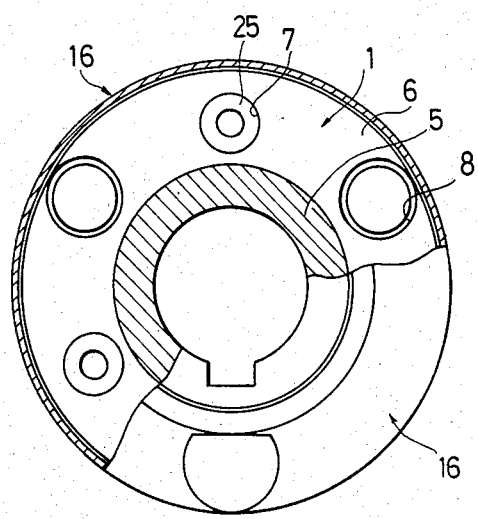
FIG. 3 is a front view, partially in cross-section, of the shaft coupling shown in FIG. 2

FIGS. 2 and 3 are a side and a front view, both being partially in cross-section, of a shaft coupling according to this invention. As illustrated, the shaft coupling essentially comprises a hub 4 on the driving shaft side (hereinafter called the driving hub), a hub 9 on the driven shaft side (hereinafter called the driven hub), a holder or holding member having an annular body 16, and coil springs 25.

The driving hub 4 has a flange 6 at one end of the cylindrical portion 5 thereof, with three spring holes 7 passing through the flange 6 in the direction of the axis thereof. The spring holes 7 are precision-finished by a reamer. Between each two adjacent spring holes 7, there is provided a bolt hole 8 that has a larger diameter than that of a reamer bolt 28 that is inserted therein, with a clearance equivalent to the amount of allowable eccentricity.

The driven hub 9 has a flange structure including a flange 11 at one end of the cylindrical portion 10 thereof. Spring holes 12 and reamer bolt holes 13 are provided in the flange 11 at points corresponding to the spring holes 7 and bolt holes 8 in the flange 6 of the driving hub 4. Although reamer-finished, the spring hole 12 does not extend entirely through the flange 11.

The holder or annular body 16 is provided with a central opening 17 through which the cylindrical portion 5 of the driving hub 4 passes and a recess 18 that accommodates the flange 6 of the driving hub 4. There are also provided closed-end spring holes 19 and reamer bolt holes 20 at points corresponding to the spring holes 7 and reamer bolt holes in the driving hub 4. An O-ring groove 21 is cut around the periphery of said opening 17. A clearance (a) for shaft alignment is provided between the opening 17 and the cylindrical portion 5 of the driving hub 4.

Each coil spring 25 is made of a wire with a rectangular cross-section and precision-ground surface. The coil spring 25 is designed to have such a diameter that the spring fits loosely in the spring holes 7, 12 and 19 at no load and fits tightly therein when compressed.

The hubs 4 and 5 are disposed so that the flanges 6 and 11 face each other, with the coil springs 25 inserted in the spring holes 7 and 12. The holder 16 is fastened to the driven hub 9 with the reamer bolt 28 so that the coil spring 25 is admitted in the spring hole 19. In this condition, the coil spring 25 is compressed. When compressed, the coil spring 25 becomes somewhat larger in outside diameter and press fits tightly in the spring holes 7, 12 and 19.

Tables 1, 1' and 1" shows examples of the outside diameter of the coil spring 25 expanded as a result of compression.

TABLE 1

In case the coil spring is compressed to 70% of its original free height.

| | Dimensions mm | | | | No. of Coils | | Spring Constant Kg/mm | Compressed Height mm | Compressed Height/ Free Height | Outside Diameter When Compressed mm | Increased in Outside Diameter mm |
|---|---|---|---|---|---|---|---|---|---|---|---|
| Spring | Product Outside Diameter | Outside Diameter after Grinding | Inside Diameter | Overall Length | Effective | Total | | | | | |
| A | 12 | 11.88 | 6 | 45 | 16 | 17.5 | 2.01 | 31.5 | 0.7 | 11.92 | 0.04 |
| B | 16 | 15.66 | 8 | 45 | 11 | 12.5 | 3.54 | 31.5 | 0.7 | 15.71 | 0.05 |
| C | 20 | 19.89 | 10 | 60 | 12 | 13.5 | 4.16 | 42 | 0.7 | 19.94 | 0.05 |
| D | 30 | 29.75 | 15 | 100 | 14 | 15.5 | 5.62 | 70 | 0.7 | 29.87 | 0.12 |
| E | 40 | 39.40 | 20 | 50 | 5 | 6.5 | 20.00 | 35 | 0.7 | 39.55 | 0.15 |
| F | 50 | 49.85 | 25 | 125 | 11 | 12.5 | 12.50 | 88 | 0.7 | 50.00 | 0.15 |
| G | 60 | 59.80 | 30 | 125 | 9 | 10.5 | 18.00 | 88 | 0.7 | 59.98 | 0.18 |

TABLE 1'

In case the coil spring is compressed to 80% of its original free height.

| | Dimensions mm | | | | Description | | | | | |
|---|---|---|---|---|---|---|---|---|---|---|
| | | Outside | | | No. of Coils | | Spring | Compressed | Compressed Height/ | Outside Diameter When | Increased in Outside |
| Spring | Product Outside Diameter | Diameter after Grinding | Inside Diameter | Overall Length | Effective | Total | Constant Kg/mm | Height mm | Free Height | Compressed mm | Diameter mm |
| A | 12 | 11.88 | 6 | 45 | 16 | 17.5 | 2.01 | 36 | 0.8 | 11.91 | 0.03 |
| B | 16 | 15.66 | 8 | 45 | 11 | 12.5 | 3.54 | 36 | 0.8 | 15.69 | 0.03 |
| C | 20 | 19.89 | 10 | 60 | 12 | 13.5 | 4.16 | 48 | 0.8 | 19.92 | 0.03 |
| D | 30 | 29.75 | 15 | 100 | 14 | 15.5 | 5.62 | 80 | 0.8 | 29.83 | 0.08 |
| E | 40 | 39.40 | 20 | 50 | 5 | 6.5 | 20.00 | 40 | 0.8 | 39.50 | 0.10 |
| F | 50 | 49.85 | 25 | 125 | 11 | 12.5 | 12.50 | 100 | 0.8 | 49.95 | 0.10 |
| G | 60 | 59.80 | 30 | 125 | 9 | 10.5 | 18.00 | 100 | 0.8 | 59.92 | 0.12 |

TABLE 1"

In case the coil spring is compressed to 65% of its original free height.

| | Dimensions mm | | | | Description | | | | | |
|---|---|---|---|---|---|---|---|---|---|---|
| | | Outside | | | No. of Coils | | Spring | Compressed | Compressed Height/ | Outside Diameter When | Increased in Outside |
| Spring | Product Outside Diameter | Diameter after Grinding | Inside Diameter | Overall Length | Effective | Total | Constant Kg/mm | Height mm | Free Height | Compressed mm | Diameter mm |
| A | 12 | 11.88 | 6 | 45 | 16 | 17.5 | 2.01 | 29.3 | 0.65 | 11.93 | 0.05 |
| B | 16 | 15.66 | 8 | 45 | 11 | 12.5 | 3.54 | 29.3 | 0.65 | 15.72 | 0.06 |
| C | 20 | 19.89 | 10 | 60 | 12 | 13.5 | 4.16 | 39 | 0.65 | 19.95 | 0.06 |
| D | 30 | 29.75 | 15 | 100 | 14 | 15.5 | 5.62 | 65 | 0.65 | 29.89 | 0.14 |
| E | 40 | 39.40 | 20 | 50 | 5 | 6.5 | 20.00 | 32.5 | 0.65 | 39.58 | 0.18 |
| F | 50 | 49.85 | 25 | 125 | 11 | 12.5 | 12.50 | 81.3 | 0.65 | 50.03 | 0.18 |
| G | 60 | 59.80 | 30 | 125 | 9 | 10.5 | 18.00 | 81.3 | 0.65 | 60.01 | 0.21 |

Now, how the coil spring 25 fits in the spring holes 7, 12 and 19 will be shown using concrete numerical figures. If spring "G" in Table 1 is the coil spring 25 and the spring holes 7, 12 and 19 are all made to a diameter of 59.85 mm+0.03 mm/−0 mm, a clearance between 0.05 mm and 0.08 mm results at no load to permit free admission of the coil spring. When the coil spring "G" is compressed, an interference of 0.10 mm to 0.13 mm arises to leave no play at all between the coil spring 25 and the spring holes 7, 12 and 19.

Table 1 indicates the above dimensions when each coil spring is compressed to 70% of its original uncompressed length. Tables 1' and 1" respectively illustrate similar spring dimensions when each coil spring is compressed to 80% and 65%, respectively, of its original uncompressed length. The spring holes, i.e. the through holes of the first hub and the closed-end holes of the second hub and the annular body, are machined to respective diameters not less than 0.02 mm greater than the ground outer diameter of the coil springs. Specifically, the coil springs when compressed have outer surfaces spaced from the inner surfaces of the spring holes by clearances equal to 0.0005 to 0.0015 times the outer diameter of the coil spring but not less than 0.02 mm. Under these conditions, the coil springs can be freely inserted into the spring holes with necessary sliding clearance therebetween, and when the coupling is assembled, the coil springs are completely pressed and fitted against the inner surfaces of the spring holes with the fitting allowances and illustrated in Tables 1, 1' and 1" (0.01 to 0.19 mm). It is difficult to finish the spring hole with an accuracy such that the clearance between the hole diameter and the outer surface of the spring is less than 0.2 mm. A satisfactory press fit cannot be obtained when the clearance exceeds 0.0015 times the outer diameter of the spring. A smaller size should be used with a spring of larger outside diameter.

The coil springs are compressed such that the axial length of each compressed coil spring is from 65 to 80% of the uncompressed length of the coil spring. When the coil spring is compressed to be less than 65% of the original spring length, the stress in the spring increases. When the coil spring is compressed such that the compressed length is greater than 80% of the uncompressed spring length, a satisfactory press fit is not obtained.

A sufficiently large space is provided inside the holder 16 in order that the flange 6 of the driving hub 4 can move freely when the shaft coupling serves to accommodate misalignment of the driving and driven shafts as they rotate. An O-ring 30 fitted in the O-ring groove 21 prevents the entrance of water and/or other substances into the holder 16.

The operation of the shaft coupling described above now will be discussed in the following.

First, the three accommodating functions of the flexible coupling, i.e., functions to accommodate offset and angular misalignments of the driving and driven shafts and axial displacement (clearance) therebetween, will be described.

1. Accommodation of Offset Misalignment

Figure 4:
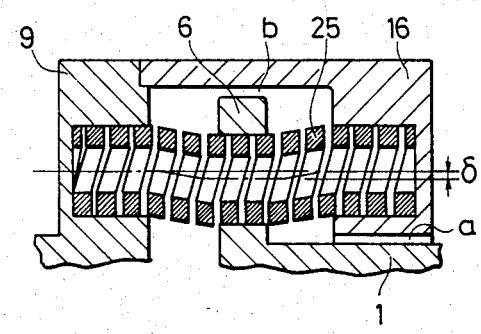
FIGS. 4 through 6 are sectional views showing how alignment is achieved by use of the shaft coupling of this invention shown in FIGS. 2 and 3.

FIG. 4 shows how the offset misalignment between two shafts is accommodated. When eccentricity δ between shafts arises, the coil spring 25 deflects axially as illustrated to accommodate the offset misalignment.

The maximum amount of misalignment offset allowable depends upon the amount of the clearances a and b and ½ of the difference between the outside diameter of the reamer bolt 28 and the diameter of the bolt hole 8 in the flange 6 on the driving hub 4 shown in FIG. 2.

2. Accommodation of Angular Misalignment

Figure 5:
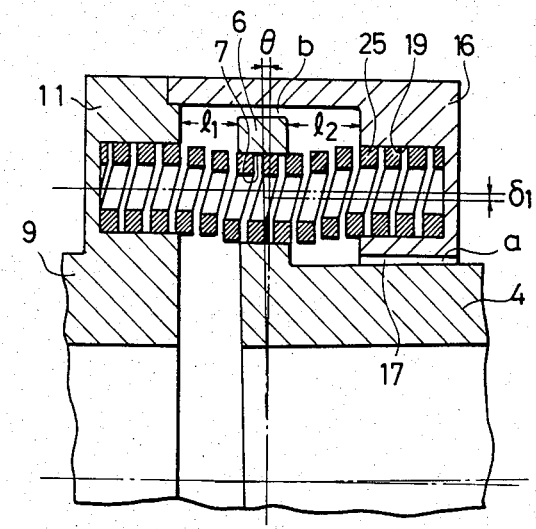

As shown in FIG. 5, angular misalignment $\theta$ (angle of axis of mating shafts) is adjusted by varying the amount of eccentricity $\delta_1$ and axial lengths $l_1$ and $l_2$. $\delta_1$ is accommodated by the same action as that described in Item 1 above, and $l_1$ and $l_2$ by compressive and expansive deformation, respectively of the springs. The maximum angular misalignment allowable is that at which $l_1$ or $l_2$ becomes zero, or that at which the flange 6 on the driving hub 4 comes in contact with the flange 11 of the driven hub 9 or the holder 16. Geometrically, of course, the maximum amount of angular misalignment is limited by the angle at which said contact takes place as the clearance a reduces to zero. Usually, however, the design is such that the clearance does not become zero even at the angle at which $l_1$ or $l_2$ becomes zero.

3. Accommodation of Axial Displacement (Clearance)

Figure 6:
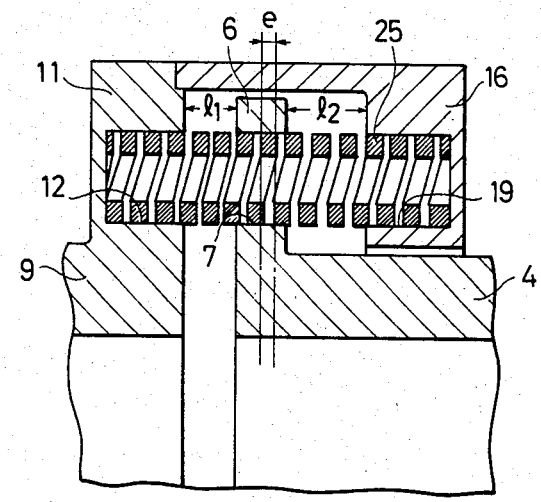

FIG. 6 shows how the axial displacement (clearance) is accommodated. Displacement e is accommodated by resiliently compressing $l_1$ and expanding $l_2$ of the spring. If the shaft coupling is installed in the condition illustrated in FIG. 6 at assembly, however, such elastic compression and expansion do not take place. With $l_1$ and $l_2$ uniformly compressed, the periphery of the coil spring 25 is pressed against the internal surface of the spring holes 7, 12 and 19, thereby establishing a neutral position. Then, axial vibration and displacement of the rotating shafts are accommodated by the compressing and expanding actions mentioned first.

Although three types of shaft misalignments have been discussed separately, they usually appear in variously mixed conditions. Limited then by the clearances a, b, c and d, their practically allowable amounts naturally become samller than those established for each individual misalignment.

Table 2 shows principal specifications of typical shaft couplings actually manufactured to the construction shown in FIG. 2.

Torque is transmitted from the driving hub 4 through the coil spring 25 and driven hub 9 to the holder 16, with the resilient force arising from the elastic deformation perpendicularly applied with the axis of the coil spring 25 and the transmitted torque balanced with the resilient force at all times. Therefore, impact torque from either the driving or driven side is absorbed and torsional vibration levelled off.

For the driving and driven hubs 4 and 9, the maximum resilient torsional angle is that at which the periphery of the reamer bolt 28 comes in contact with the bolt hole 8 provided in the flange 6 on the driving hub 4. Any excess torque is transmitted from the driving hub 4 through the reamer bolt 28 and the driven hub 9 to the holder 16 simultaneously, but in this case torque is transmitted in the rigid state.

When the embodiment of FIG. 2 is assembled, the coil spring 25 is compressed. At rest, the coil spring 25 exerts no thrust upon either of the driving and driven hubs 4 and 9. When vibrations with axial displacement arise during rotation, the compressed coil spring 25 exerts a thrust force proportionally to the amount of said displacement, whereby the axial vibrations are decreased rapidly.

In describing other embodiments, reference will be made to the other drawings in which parts that are substantially the same as those shown in the drawings mentioned in the previous descriptions are designated by like reference characters and no explanation will be given thereto.

Preferred Embodiment No. 2

Figure 7:
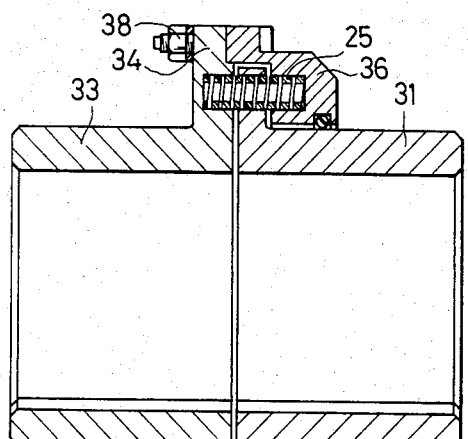
FIG. 7 is a cross-sectional view showing a second embodiment of this invention.

In the embodiment shown in FIG. 2, the reamer bolt 28 is passed through the bolt hole 8 in the flange 6 on the driving hub 4. FIG. 7 shows an embodiment in which no bolt hole is provided on the driving hub 31. Instead, a flange 34 on a driven hub 33 and a holder 36 are made larger than those of the first embodiment and fastened together directly with a reamer bolt 38. Although larger in outside diameter, this shaft coupling permits fitting more coil springs 25 than the first embodiment shown in FIG. 2. The embodiment shown in FIG. 7 is a shaft coupling that contains 24 coil springs 25. In the embodiment of FIG. 2, the reamer bolt 28 and bolt hole 8 come into contact with each other to transmit torque directly, rather than by way of the coil spring 25, thereby protecting the coil spring 25 from excess torque. The embodiment of FIG. 7 lacks this protective function, but is designed to provide sufficient resilient transmitting capacity of the coil springs.

TABLE 2

| Principal Specifications | | Type | | | |
|---|---|---|---|---|---|
| | | A | B | C | D |
| Outside Diameter mm | | 55 | 90 | 150 | 260 |
| Overall Length mm | | 51 | 82 | 142 | 263 |
| Shaft Diameter Range mm | | 7~16 | 10~32 | 22~65 | 70~120 |
| Permissible offset Misalignment mm | | 0.2 | 0.5 | 0.5 | 1 |
| Permissible Angular Misalignment deg | | 1° | 1° | 1° | 1° |
| Permissible Axial Displacement mm | | ±1 | ±2 | ±2 | ±3 |
| Torque Transmitted Kg-m | Resilient Torque | 1 | 5 | 40 | 400 |
| | Permissible Max. Torque (Rigid) | 4 | 20 | 160 | 1600 |
| Resilient Torsional Angle deg | | 1°38' | 1°44' | 0°57' | 1°04' |
| Weight Kg | | 0.5 | 2.3 | 11 | 53 |
| $GD^2$ Kg-m$^2$ | | 0.0005 | 0.009 | 0.10 | 1.4 |
| Coil Spring (Dimensions, mm) × Number | | (10$\phi$ × 5$\phi$i × 25) × 3 | (14$\phi$ × 7$\phi$i × 45) × 3 | (16$\phi$ × 8$\phi$i × 50) × 8 | (25$\phi$ × 12.5$\phi$i × 100) × 8 |
| Reamer Bolt (Dimensions, mm) × Number | | (M8 × 8$\phi$) × 3 | (M12 × 12$\phi$) × 3 | (M14 × 14$\phi$) × 8 | (M20 × 20$\phi$) × 8 |

Figure 8:
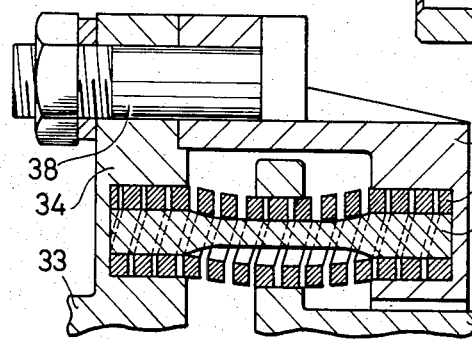
FIG. 8 is a cross-sectional view showing a modification of the principal part of the shaft coupling shown in FIG. 7.

FIG. 8 shows a modification of the embodiment in FIG. 7, which makes up for such lack by providing an hourglass-shpaed or middle-reduced pin 39 in the coil spring 25. The coil spring is allowed to deform elastically by the amount of reduction in the middle of the pin 39. Imposition of excess load on the coil spring also can be prevented by replacing some of the coil springs with stopper pins that are provided in the same manner as the reamer bolt in FIG. 2.

Preferred Embodiment No. 3

Figure 9:
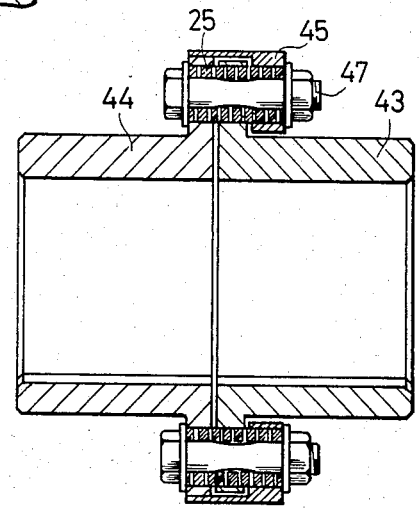
FIG. 9 is a cross-sectional view showing a third embodiment of this invention.
Figure 10:
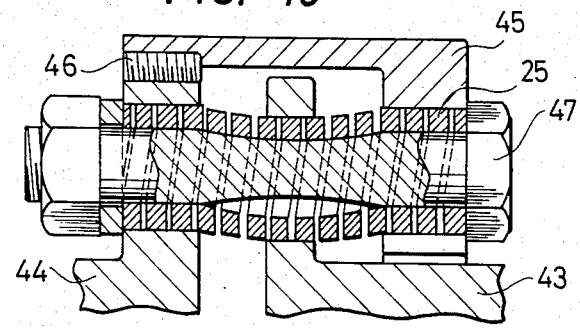
FIG. 10 is a detail view showing the principal part of the shaft coupling shown in FIG. 9.

FIGS. 9 and 10 shown a third embodiment in which the embodiment in FIGS. 2 and 8 are, so to speak, combined, with the reamer bolt shown in FIG. 2 passed through the opening at the center of the coil spring 25. A driving hub 43 is identical with the one in FIG. 2 in construction. Since there is some clearance between the inside diameter of the coil spring 25 and the periphery of the reamer bolt 47, a driven hub 44 and a holder 45 must be fixed with a set bolt 46 with a hexagonal hole, taper pin or other means so as not to rotate relatively in the direction of circumference.

As shown in FIG. 10, the reamer bolt 47 also must be hourglass-shaped like the one in FIG. 8.

Figure 11:
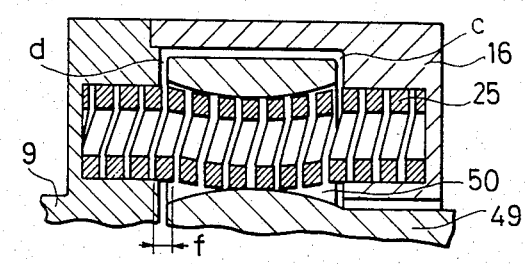
FIG. 11 is a cross-sectional view showing a modification of the principal part of the shaft coupling shown in FIG. 9.

The clearances c and d shown in FIG. 2 be magnified in FIGS. 4, 5, 6, 8 and 10 that illustrate how the coil spring is inert. Actually, however, it is preferable that the clearances c and d are smaller than the width of the rectangular cross-section of the wire that makes up the coil spring 25, as shown in FIG. 11. To permit the coil spring 25 to deform freely, the spring hole 50 in the driving hub 49 must be flared toward both ends. With the thickness f of the wire that makes up the coil spring 25 larger than the clearances c and d, the coil spring 25 transmits excess torque with shearing force, thereby reducing the possibility of fracture of the coil spring to a minimum. This eliminates the need of protecting the coil spring 25 by inserting a pin or reamer bolt therethrough.

Preferred Embodiment No. 4

Figure 12:
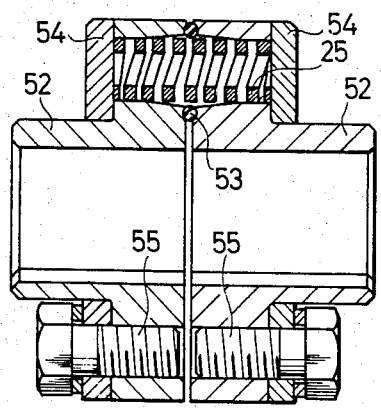

The shaft couplings so far described all have a holder that prevents the thrust developed by the compression of the coil spring from working on either of the driving and driven hubs. A shaft coupling shown in FIG. 12 is suited for applications where a small amount of thrust is allowable. The hubs 52 on the driving and driven sides are identical in shape. A sealing O-ring 53 is inserted between the two hubs 52. The coil spring 25 is compressed by a clamping bolt 55 through a keep plate 54, without using a reamer bolt. This is the most compact and lowest-priced shaft coupling, compared with those in FIGS. 2 through 11.

Figure 13:
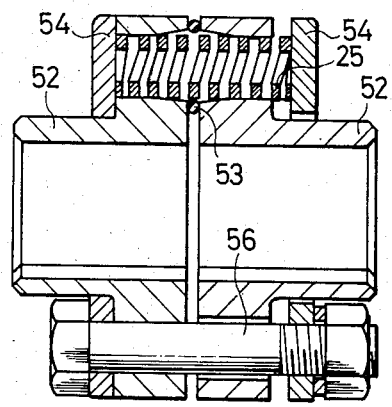

FIG. 13 shows a modification in which the clamping bolt 55 in FIG. 12 is replaced with a reamer bolt 56, which reduces thrust to some extent at a partial sacrifice of the stability with which the coil spring 25 is compressed.

Preferred Embodiment No. 5

FIG. 14 shows a fifth embodiment of this invention.

While the holders 16, 36 and 45 of the three embodiments shown in FIGS. 2, 7 and 9 were formed in one piece, a holder 60 of this embodiment consists of two parts. Namely, the holder 60 is composed of a mounting part or holder proper 61, which is fixed to flange 11 by bolts 64 and forms therewith a flange structure, and an annular cover or body 62 which is fastened together with a bolt 63. Like the bolt 28 and pin 39 in the preceding embodiment, the bolt 63 also serves to ensure that no excess load is imposed on the coil spring 25.

The holder 60 is fastened with bolt 64 to the flange 11 of the driven hub 9. With this embodiment, the hubs 4 and 9 can be coupled together after the coil spring 25 and holder 60 have been attached to the driving hub 4.

Preferred Embodiment No. 6

FIG. 15 shows a sixth embodiment of this invention.

The holder 67 is made up of a cylindrical mounting part or holder proper 68, which is fixed to flange 11 by bolts 76 and forms therewith a flange structure, and a cover or body 72. The holder proper 68 is provided with a reamer-finished spring hole 69 that corresponds to the spring hole 7 in the flange 6 of said driving hub 4 and a fastening bolt hole 70 that is drilled coaxially with the spring hole 69. An annular portion 71 projects axially from one end of the holder proper 68.

A reamer-finished spring hole 73, which corresponds to said spring holes 7 and 69, is provided in the cover 72.

The holder proper 68 is fastened by bolt 76 to the flange 11 of the driven hub 9. The coil spring 25 is passed through the spring hole 7 in the flange 6, with one end thereof inserted in the spring hole 69 in the holder proper 68. With the cover 72 fitted to the annular portion 71 of the holder proper 68 so that the other end of the coil spring 25 enters the spring hole 73 therein, the cover 72 is pressed toward the holder proper 68. Consequently, the coil spring 25 is compressed, with a slight increase in outside diameter, and therefore tightly fitted in the spring holes 7, 69 and 73. The cover 72 is also tightly fitted to the annular portion 71 of the holder proper 68.

During the assembling process just described, an elastic force arising from the compression of the coil spring 25 works to separate the holder proper 68 and the cover 72 from each other. Therefore, a friction resulting from the fitting of the holder proper 68 and cover 72 must be much greater than the separating force exerted by the coil spring 25. Greater safety ca be insured by welding the holder proper 68 and cover 72 together.

The driving hub 4, spring holder 67 and coil spring 25 are integrally put together to form a driving side assembly. In fitting the shaft coupling to the transmission system, the driving side assembly and the driven hub 9 are properly aligned, and the flange 11 on the driven hub 9 and the holder 67 are fastened together with a bolt 76.

FIG. 16 shows a modification of the embodiment shown in FIG. 15.

As may be seen, a pin 78 is interposed between coil springs 25, with both ends of the pin 78 supported by the holder proper 68 and the cover 72. In the flange 6 of the driving hub 4, there is provided a pin hole 79 in which the pin 78 fits with a radial clearance equivalent to the maximum amount of deflection the coil spring undergoes. The holder 67 is fastened to the flange 11 of the driven hub 9 with a pin 80.

As in the preceding embodiment, the pin 78 serves to prevent the application of excess load on the coil spring 25.

Preferred Embodiment No. 7

Figure 17:
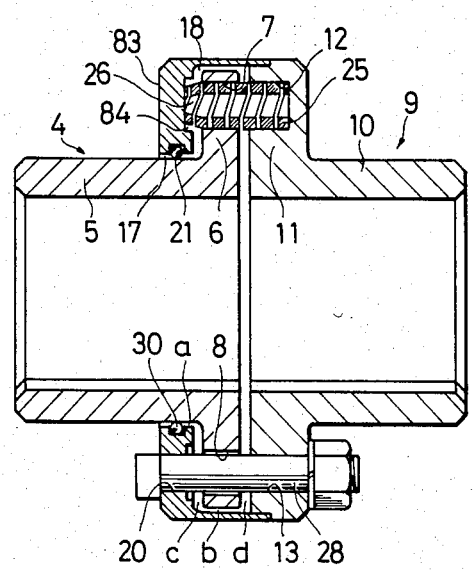

As illustrated in FIG. 17, a shallow hole 84, rather than the drilled spring hole provided in the preceding embodiment, is provided in the holder 83 of a seventh embodiment. One end of the coil spring 25 forms a frustum of circular cone 26 that fits in the shallow hole 84.

Figure 18:
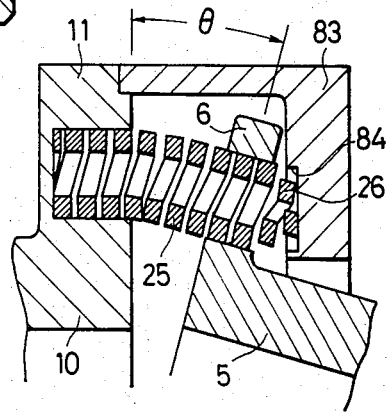
FIGS. 18 and 19 are section illustrating how alignment is achieved by the embodiment shown in FIG. 17.

As shown in FIG. 18, the coil spring is tightly fitted only to the driving and driven hubs. Unlike the arrangement shown in FIG. 4, the coil spring of this embodiment is not tightly fitted to the holder, but its end is allowed to move freely with respect to the holder. This permits accommodating a very wide range of angular misalignment with ease.

Figure 19:
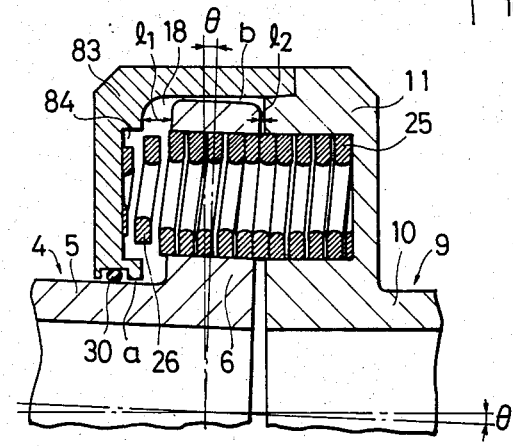

FIG. 19 illustrates how angular misalignment can be accommodated. The angular misalignment over an angle θ results from the axial bending of the coil spring as shown in FIG. 18. This angular misalignment is accommodated by changes in the clearance $l_1$ between the flange 6 of the driving hub 4 and the holder 83 and the clearance $l_2$ between said flange 6 and the flange 11 of the driven hub 9 shown in FIG. 19. The clearances $l_1$ and $l_2$ are adjusted by expansive and compressive deformations, respectively.

The maximum allowable angular misalignment occurs at an angle at which $l_1$ or $l_2$ becomes zero, that is, when the flange 6 of the driving hub 4 comes into contact with the flange 11 of the driven hub 9 or the holder 83.

Geometrically, of course, the amount of angular misalignment is limited by the angle at which the clearance a becomes zero as a result of contact. Practically however, the design is such that the clearance a does not becomes zero even at the angle at which $l_1$ or $l_2$ becomes zero.

Also, the design is such that the reamer bolt 28 does not come into contact with the reamer bolt hole 8 provided in the flange 6 of the driving hub 4 even at the angle at which maximum allowable angular misalignment occurs.

Figure 21:
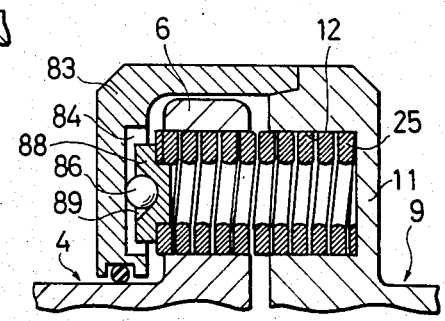

Table 3 lists typical examples of actual shaft couplings of the type shown in FIG. 17.

thrusting into the coil spring under the influence of the compressive force exerted thereby, provision of the spring seat 88 in FIG. 21 not only eliminates that risk but also facilitates removing the ball 86 when the assembly is taken apart.

Preferred Embodiment No. 8

Figure 22:
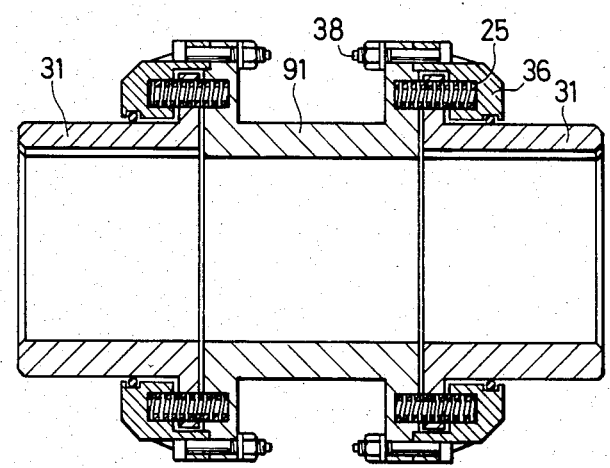
FIG. 22 is a cross-sectional view showing two shaft couplings, combined as the spacer type coupling shown in FIG. 7.

FIG. 22 shows a spacer-type shaft coupling for use with large pumps, compressors and so on, which comprises a spacer 91 consisting of two driven-side flanges 33 shown in FIG. 7 that are put together back to back.

Preferred Embodiment No. 9

FIG. 23 shows an example of intermediate-shaft type shaft couplings. As illustrated, two intermediate hubs 31, which are similar in construction to the driving hub in FIG. 7, are coupled together with a intermediate shaft 93 placed therebetween. To the intermediate hubs 31 are coupled a driving hub 33, a driven hub 33a of the same construction, and holders 95 resembling the one shown in FIG. 17 by way of coil springs 25. The hubs 33 and 33a and respective holders 95 are coupled together with reamer bolts 38. Spring seats 97 have spherical surfaces 98, in place of the balls 86 described previously.

The intermediate hub 31 of this embodiment has no bolt hole. Instead, the flanges of the driving and driven hubs 33 and 33a and the holders 95 are all made larger and are fastened together directly by the reamer bolts 38. Although the outside diameter is larger than that of the embodiment shown in FIG. 17, this embodiment permits insetting a larger number of coil springs. The

TABLE 3

| Principal Specifications | Type | | | |
|---|---|---|---|---|
| | A | B | C | D |
| Outside Diameter mm | 55 | 90 | 150 | 260 |
| Overall Length mm | 51 | 82 | 142 | 263 |
| Shaft Diameter Range mm | 7~16 | 10~32 | 22~65 | 70~120 |
| Permissible offset Misalignment mm | 0.04 | 0.1 | 0.1 | 0.2 |
| Permissible Angular Misalignment deg | 3° | 3° | 3° | 3° |
| Permissible Axial Displacement mm | ±1 | ±2 | ±2 | ±3 |
| Torque Transmitted Kg-m  Resilient Torque | 0.5 | 2.5 | 20 | 200 |
| Torque Transmitted Kg-m  Permissible Max. Torque (Rigid) | 4 | 20 | 160 | 1600 |
| Resilient Torsional Angle deg | 1°38' | 1°44' | 0°57' | 1°04' |
| Weight Kg | 0.5 | 2.3 | 11 | 53 |
| $GD^2$ Kg-$m^2$ | 0.0005 | 0.009 | 0.10 | 1.4 |
| Coil Spring (Dimensions, mm) × Number | (10φ × 5φi × 22) × 3 | (14φ × 7φi × 40) × 3 | (16φ × 8φi × 45) × 8 | (25φ × 12.5φi × 90) × 8 |
| Reamer Bolt (Dimensions, mm) × Number | (M8 × 8φ) × 3 | (M12 × 12φ) × 3 | (M14 × 14φ) × 8 | (M20 × 20φ) × 8 |

In the embodiment shown in FIG. 17, both end surfaces of the coil spring 25 are in close contact with the bottom surfaces of the spring hole 12 in the flange 9 of the driven hub and the hole 84 in the holder 83. The close contact of the end surface somewhat restricts the displacement and deformation of the left-hand end of the coil spring 25 that occurs when angular misalignment is adjusted. To permit smoother displacement and deformation, the left-hand end of the coil spring shown in FIG. 17 is formed into a frustum of circular cone 26 as mentioned previously. To facilitate the displacement and deformation, an embodiment shown in FIG. 20 has a ball 86 interposed between the bottom of the hole 84 in the holder 83 and the end of the coil spring 25.

Figure 20:
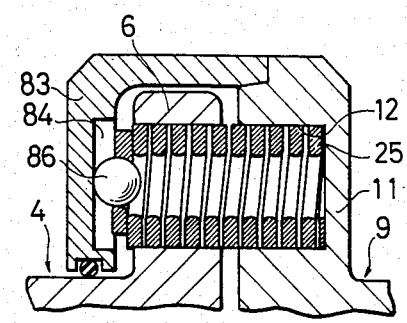
FIGS. 20 and 21 are cross-sectional views showing modifications of the spring seat in the embodiment shown in FIG. 17.

An embodiment shown in FIG. 21 has a spring seat 88 having a conical hole 89 on the left side of the coil spring 25, with a ball 86 interposed between said seat 88 and the bottom of the hole 84. While the embodiment shown in FIG. 20 is not free from the risk of the ball 86 embodiment shown in FIG. 23 contains 24 coil springs 25.

The embodiment illustrated functions excellently as a floating-shaft coupling, with radial vibrations of the intermediate shaft 93 minimized by the effect of the play-free coil springs 25 and axial vibrations decreased rapidly by the thrust force resulting from the compression of the coil springs 25.

Figure 25:
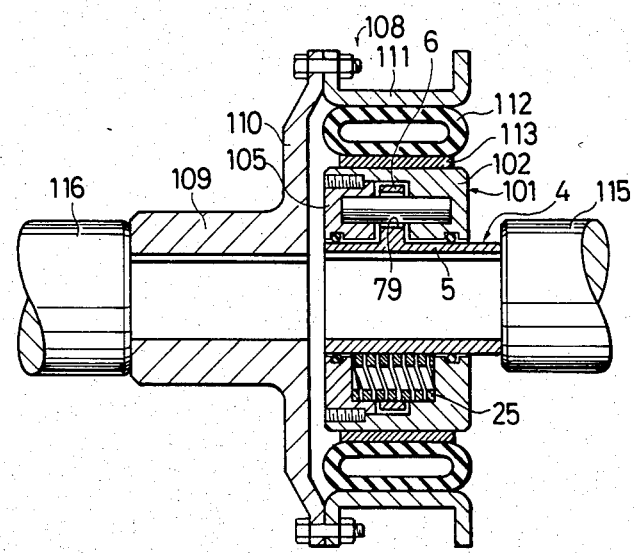

FIGS. 24 and 25 still another embodiment of this invention. A driving hub 4 and holder 101 are virtually identical to those shown in FIG. 16. The difference lies in the use of an air clutch of known type that is coupled in place of a driven hub.

As shown in FIGS. 24 and 25, a cover 105 is fastened to a holder proper 102 by at least one set screw 106.

An air clutch 108 attaches a cylindrical metal holder 111 to a flange 110 of a hub 109. A rubber tire-like member 112 is attached to the internal surface of the metal holder 111, with a lining 113 fastened to the internal surface of the tire 112. A compressed-air source (not shown) is connected to the tire 112.

FIG. 24 shows a condition in which the pressure in the tire 112 is atmospheric, with the clutch 108 disconnected. In this state, the tire 112 is deflated and the lining 108 is away from the external surface of the holder 101. Accordingly, torque is not transmitted from a driving shaft 115 to a driven shaft 116. FIG. 25 shows a condition in which the clutch 108 is connected and the tire 112 is pressurized (usually to between 5 kg/cm² and 8 kg/cm²) by compressed air. In this state, the internal surface of the tire 112 projects inwardly, with the lining 113 pressed against the external surface of the holder 101 to rotate integrally therewith. As a consequence, torque is transmitted from the driving shaft 115 to the driven shaft 116 via the hub 4, coil spring 25, holder 101 and clutch 108.

Preferred Embodiment No. 11

Figure 26:
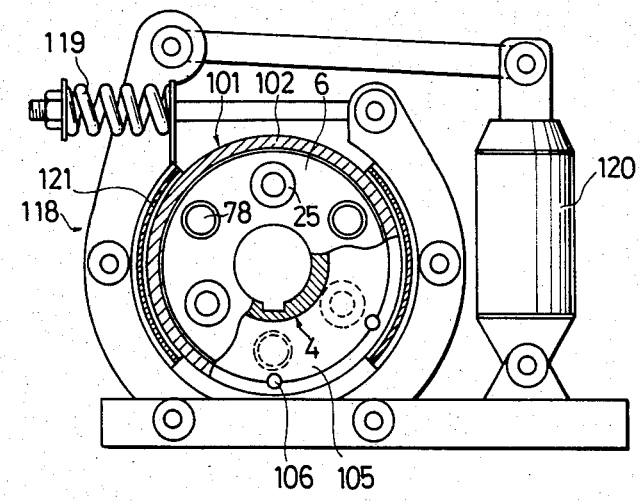
FIG. 26 is a front view, partially in cross-section, of a shaft coupling equipped with a brake.

FIG. 26 shows an embodiment which comprises the shaft coupling shown in FIGS. 24 and 25 coupled to a brake.

A brake 118 has a brake shoe 121 which is adapted to be closed by the force of a coil spring 119 and opened by the output of a hydraulic cylinder 120 and placed near the periphery of the holder 101. When the hydraulic cylinder 120 is in action, the brake shoe 121 is detached from the periphery of the holder 101 and, therefore, the brake is not working. When the hydraulic cylinder 120 is brought out of action, the spring forces the brake shoe 121 against the holder 101 to produce a braking action.

What is claimed is:

1. A shaft coupling structure comprising:
   first and second hubs for connection to respective shafts;
   said first hub including a cylindrical portion having extending outwardly from one end thereof a flange having spaced around the circumference thereof a plurality of through holes extending entirely through said flange;
   said second hub including a cylindrical portion having extending outwardly from one end thereof a flange structure having spaced around the circumference thereof a plurality of closed-end holes;
   said hubs being positioned with said flange and said flange structure facing each other with axial clearance therebetween and with said through holes of said first hub aligned with respective said closed-end holes of said second hub;
   a holding member including an annular body having therethrough a center opening and spaced therearound a plurality of closed-end holes, said holding member being positioned on the axial side of said flange of said first hub opposite that of said flange structure of said second hub, with said cylindrical portion of said first hub extending through said center opening of said annular body and with said closed-end holes of said annular body aligned with respective said through holes of said first hub;
   a plurality of coil springs, each said coil spring being formed by a coiled wire having a rectangular cross section, and each said coil spring being positioned to extend through a respective said through hole of said first hub with opposite axial ends of said coil spring extending into and abutting bottom surfaces of respective said closed-end holes of said second hub and said annular body;
   means connecting said annular body of said holding member to said flange structure of said second hub for axially compressing therebetween said coil springs such that the axial length of said compressed coil springs is from 65–80% of the uncompressed length of said coil springs, and thereby for radially enlarging said coil springs and bringing said coil springs into tight, press fitting abutment with inner surfaces of said through holes of said first hub and said closed-end holes of said second hub and said annular body;
   said coil springs when uncompressed having outer surfaces spaced from said inner surfaces of said through holes of said first hub and said closed-end holes of said second hub and said annular body by clearances equal to 0.0005–0.0015 times the outer diameter of said coil springs but not less than 0.02 mm, and said clearances being smaller than the radial increments of said coil spring that occur when the coil spring is axially compressed; and
   the diametral outer surface of said coil spring being ground so that said clearances are secured.

2. A structure as claimed in claim 1, wherein said connecting means comprise a plurality of bolts passing through respective holes in said flange of said first hub and fixed to said flange structure of said second hub and to said annular body of said holding member.

3. A structure as claimed in claim 2, wherein said holding member further includes a cylindrical portion extending axially from said annular body at a position radially outwardly of said flange of said first hub and abutting said flange structure of said second hub.

4. A structure as claimed in claim 2, wherein opposite ends of said through holes of said first hub are flared outwardly.

5. A structure as claimed in claim 1, wherein said connecting means comprise a cylindrical portion of said holding member extending axially from said annular body at a position radially outwardly of said flange of said first hub and fixed to said flange structure of said second hub.

6. A structure as claimed in claim 5, further comprising bolts fixing said cylindrical portion of said holding member to said flange structure of said second hub.

7. A structure as claimed in claim 5, further comprising set screws fixing said cylindrical portion of said holding member to said flange structure of said second hub.

8. A structure as claimed in claim 1, wherein said flange structure of said second hub comprises an integral flange and an annular mounting part connected to said flange, said mounting part having therein the respective said closed-end holes.

9. A structure as claimed in claim 8, further comprising a cylindrical portion integral with said mounting part and extending axially therefrom at a position surrounding said flange of said first hub and abutting said annular body of said holding member.

10. A structure as claimed in claim 9, further comprising at least one bolt fixing said flange of said second hub to said mounting part.

11. A structure as claimed in claim 9, further comprising at least one pin fixing said flange of said second hub to said mounting part.

12. A structure as claimed in claim 9, wherein said connecting means comprise a plurality of bolts passing through respective holes in said flange of said first hub and fixed to said mounting part of said second hub and to said annular body of said holding member.

13. A structure as claimed in claim 9, wherein said connecting means comprises a friction fit between said cylindrical portion of said mounting part and said annular body of said holding member.

14. A structure as claimed in claim 1, further comprising respective pins positioned within respective said coil springs, each said pin having a reduced diameter mid-length portion.

15. A spacer-type shaft coupling structure comprising:
   first and second hubs for connection to respective shafts;
   a spacer member having opposite ends thereof connected between said first and second hubs;
   each of said first and second hubs including a cylindrical portion having extending outwardly from one end thereof a flange having spaced around the circumference thereof a plurality of through holes extending entirely through said flange;
   said spacer member including a cylindrical portion having extending outwardly from each of said opposite ends thereof a flange structure having spaced around the circumference thereof a plurality of closed-end holes;
   said first and second hubs being positioned with each said flange a respective flange structure of said spacer member with axial clearance therebetween and with said through holes of said first and second hubs aligned with respective said closed-end holes of said spacer member hub;
   a pair of holding members, each said holding member including an annular body having therethrough a center opening and spaced therearound a plurality of closed-end holes, each said holding member being positioned on the axial side of a respective flange of said first and second hubs opposite that of a corresponding flange structure of said spacer member, with each said cylindrical portion of said first and second hubs extending through a respective center opening of said annular body of one of said holding members and with said closed-end holes of each said annular body aligned with respective said through holes of said first and second hubs;
   a plurality of coil springs, each said coil spring being formed by a coiled wire having a rectangular cross section, and each said coil spring being positioned to extend through a respective said through hole of said first and second hubs with opposite axial ends of said coil spring extending into and abutting bottom surfaces of respective said closed-end holes of said spacer member and a corresponding said annular body;
   means connecting said annular body of each said holding member to a respective said flange structure of said spacer member for axially compressing therebetween said coil springs such that the axial length of said compressed coil springs is from 65–80% of the uncompressed length of said coil springs, and thereby for radially enlarging said coil springs and bringing said coil springs into tight, press fitting abutment with inner surfaces of said through holes of said first and second hubs and said closed-end holes of said spacer member and each said annular body;
   said coil springs when uncompressed having outer surfaces spaced from said inner surfaces of said through holes of said first and second hubs and said closed-end holes of said spacer member and each said annular body by clearances equal to 0.0005–0.0015 times the outer diameter of said coil springs but not less than 0.02 mm, and said clearances being smaller than the radial increments of said coil spring that occur when the coil spring is axially compressed; and
   the diametral outer surface of said coil spring being ground so that said clearances are secured.

* * * * *